United States Patent
Ishizuka et al.

(10) Patent No.: US 8,437,055 B2
(45) Date of Patent: May 7, 2013

(54) IMAGE PROCESSING APPARATUS, IMAGE PROCESSING METHOD, IMAGE PROCESSING SYSTEM, AND COMPUTER-READABLE MEDIUM

(75) Inventors: Ryuichi Ishizuka, Kawasaki (JP); Mari Kodama, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 562 days.

(21) Appl. No.: 12/717,661

(22) Filed: Mar. 4, 2010

(65) Prior Publication Data

US 2011/0063699 A1 Mar. 17, 2011

(30) Foreign Application Priority Data

Sep. 16, 2009 (JP) .................................. 2009-214755

(51) Int. Cl.
*H04N 1/46* (2006.01)
*G06K 15/00* (2006.01)

(52) U.S. Cl.
USPC ........................................ 358/530; 358/1.16

(58) Field of Classification Search .................. 358/530, 358/1.18, 1.16, 1.17, 1.9, 1.12, 3.13, 3.23, 358/1.11
See application file for complete search history.

(56) References Cited

U.S. PATENT DOCUMENTS 6,943,915 B1 9/2005 Teraue
7,480,070 B2 * 1/2009 Falk .............................. 358/1.18

FOREIGN PATENT DOCUMENTS

JP 10-248017 A 9/1998
JP 2001-157074 A 6/2001

* cited by examiner

*Primary Examiner* — Charlotte M Baker
(74) *Attorney, Agent, or Firm* — Sughrue Mion, PLLC

(57) ABSTRACT

An image processing apparatus includes a first storage unit, a second storage unit, a conversion unit and a determination unit. The first storage unit stores color conversion information for converting a name of a spot color other than process colors into a combination of the process colors. The second storage unit stores additional print material information regarding an additional print material. The additional print material information is input by a user for the name of the spot color. The conversion unit converts the name of the spot color, which is included in image data, into the combination of the process colors based on the color conversion information. The determination unit determines, for the name of the spot color included in the image data, a use amount of the additional print material, based on the additional print material information.

8 Claims, 11 Drawing Sheets

SPECIAL EFFECT: GLOSS ⌄
LEVEL: 1 ⌄

USE COLORIMETER

HOW TO PUT
SPECIAL MATERIAL: SOLID ⌄

NAME OF
SPOT
COLOR:

REGISTRATION
CANCEL

FIG. 8

| CATEGORY | COLOR | NAME OF SPOT COLOR | L*a*b* | CMYK CONVERSION VALUES | SPECIAL EFFECT | * |
|---|---|---|---|---|---|---|
| | | 1 | (65.86, 12.91, 19.64) | (2.35, 20.00, 25.88, 0... | MATTING | |
| | | 2 | (84.09, 14.97, 13.45) | (2.75, 22.75, 20.39, 0... | | |
| | | 3 | (82.70, 18.47, -1.46) | (4.31, 25.49, 4.71, 0... | | |
| | | 4 | (78.12, 31.81, 14.29) | (0.00, 38.82, 23.53, 0... | | |
| | | 5 | (80.68, 24.83, 24.98) | (0.00, 32.94, 33.33, 0... | | |
| | | 6 | (79.54, 26.65, 31.91) | (0.00, 35.29, 40.39, 0... | | |
| | | 7 | (82.71, 17.50, 38.18) | (0.00, 27.45, 45.88, 0... | | |
| | | 8 | (85.78, 9.39, 39.74) | (1.18, 18.82, 46.67, 0... | | |
| | | 9 | (88.71, 0.31, 47.26) | (3.14, 9.41, 52.16, 0... | | |
| | | 10 | (88.29, -13.90, 44.6... | (16.08, 0.39, 52.55, 0... | | |
| | | 11 | (86.16, -20.72, 45.0... | (23.92, 0.00, 55.29, 0... | | |
| | | 12 | (83.55, -21.20, 41.5... | (27.84, 0.39, 55.69, 0... | | |
| | | 13 | (81.61, -25.39, 31.5... | (35.29, 0.00, 49.41, 0... | | |
| | | 14 | (79.18, -31.01, 28.0... | (42.35, 0.00, 49.41, 0... | | |
| | | 15 | (78.32, -41.26, 7.76) | (52.16, 0.00, 37.25, 0... | | |
| | | 16 | (78.88, -35.75, -2.8... | (50.20, 0.00, 27.45, 0... | | |

IMAGE PROCESSING APPARATUS, IMAGE PROCESSING METHOD, IMAGE PROCESSING SYSTEM, AND COMPUTER-READABLE MEDIUM

CROSS-REFERENCE TO RELATED APPLICATIONS

This application is based on and claims priority under 35 USC 119 from Japanese Patent Application No. 2009-214755 filed Sep. 16, 2009.

BACKGROUND

1. Technical Field

The present invention relates to an image processing apparatus, an image processing method, and an image processing system.

2. Summary

According to an aspect of the invention, an image processing apparatus includes a first storage unit, a second storage unit, a conversion unit and a determination unit. The first storage unit stores color conversion information for converting a name of a spot color other than process colors into a combination of the process colors. The second storage unit stores additional print material information regarding an additional print material. The additional print material information is input by a user for the name of the spot color. The conversion unit converts the name of the spot color, which is included in image data, into the combination of the process colors based on the color conversion information. The determination unit determines, for the name of the spot color included in the image data, a use amount of the additional print material, based on the additional print material information.

BRIEF DESCRIPTION OF THE DRAWINGS

Exemplary embodiments of the invention will be described in detail below based on the accompanying drawings, wherein:

FIG. 6 is a view showing an example of a spot color name registration screen;

FIG. 8 is a view showing an example of a spot color name management screen;

DETAILED DESCRIPTION

Exemplary embodiment of the invention will be described below with reference to the accompanying drawings.

Figure 1:
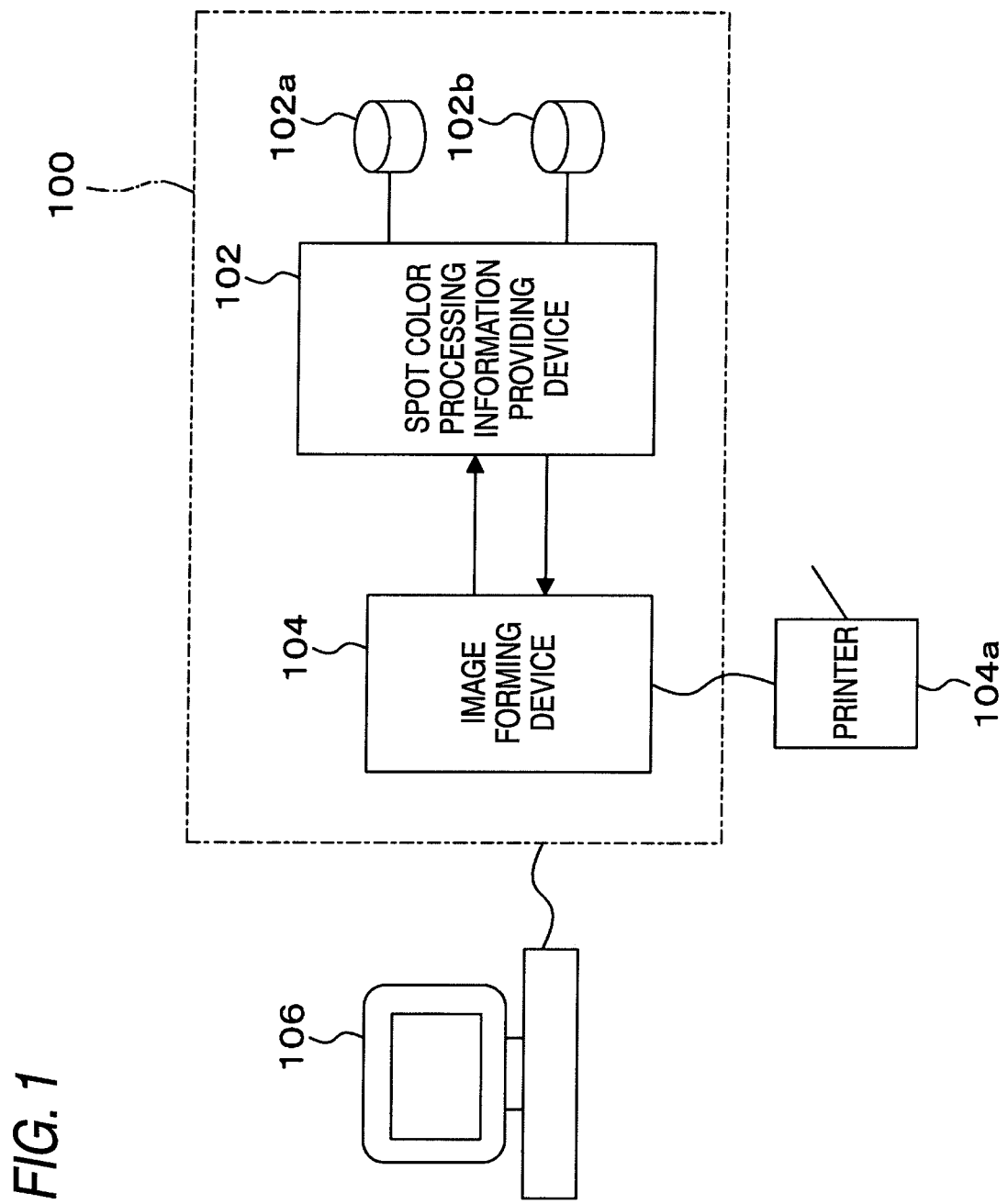
FIG. 1 is a diagram showing a configuration example of an image processing system according to an exemplary embodiment.

FIG. 1 shows a configuration example of an image processing system according to an exemplary embodiment. In FIG. 1, an image processing system 100 includes a spot color processing information providing device 102 and an image forming device 104.

The spot color processing information providing device 102 may be implemented by a computer, and functions as a server that provides information for processing a spot color(s) included in image data to the image forming device 104. A color conversion information storage device 102a (an example of a first storage unit) stores color conversion information for converting a name of the spot color name into a combination of process colors (e.g., cyan (C), magenta (M), yellow (Y), black (K)). The color conversion information may be based on colorimetric data of the spot color. An additional print material information storage device 102b (an example of a second storage unit) stores additional print material information regarding an additional print material. The stored additional print material information may be input for the name of the spot color by a user. The spot color processing information providing device 102 exchanges the color conversion information and the additional print material information with the color conversion information storage device 102a and the additional print material information storage device 102b and provides those information to the image forming device 104. The "additional print material" means a print material regarding the gloss which is additionally used to more faithfully reproduce the characteristic of a certain spot color in addition to the normal process colors when the certain spot color is printed by a printer. Examples of the additional print material include a gloss adjusting material such as a transparent toner, a matting material and a material representing glittering of a metal (metal tone). Also, the additional print material information may include information for determining (i) a use amount of the additional print material, and (ii) a drawing method such as a pattern, a density and hatching in printing the additional print material on a medium such as paper. The additional print material information may be input from an external computer such as a print control device 106 by the user. Alternatively, the additional print material information may be input from an input device provided in the spot color processing information providing device 102.

Contents of the additional print material information storage device 102b may be temporarily changed by the print control device 106, for example. Details of the changing will be described later.

The image forming device 104 acquires the color conversion information and the additional print material information, as the information for processing the spot color, from the spot color processing information providing device 102. Then, the image forming device 104 generates (i) color information indicating a combination of process colors which is obtained by converting the name of the spot color included in the image data acquired from the print control device 106 and (ii) information for determining for the name of the spot color the use amount of the additional print material and the drawing method. The image forming device 104 outputs these information to the printer 104*a* to print the spot color image on the medium such as paper. Also, the image forming apparatus 104 may generate images other than the spot color included in the image data, and synthesize the other images with the spot color image for print out. The printer 104*a* may be of an electro-photographic type printer or an ink droplet discharge type printer, for example. The image processing system 100 may be configured so that the spot color image may be displayed on a display device such as a liquid crystal display based on the color gamut adjustment information and the information regarding the amount of additional print material and the drawing method.

The spot color processing information providing device 102 and the image forming device 104, which are included in the image processing system 100, may run on the same computer or may be distributed over separate computers and connected via a communication line.

Also, the print control device 106 may be implemented by a personal computer. The print control device 106 is connected to the image processing system 100 via a communication line such as a network and outputs the image data of a print object as well as a print instruction to the image forming device 104. Also, the print control device 106 instructs the spot color processing information providing device 102 to perform a process for registering the name(s) of the spot color name(s). Further, the print control device 106 further outputs to the spot color processing information providing device 102 a temporary change instruction for temporarily changing the additional print material information, which is stored in the additional print material information storage device 102*b*.

Figure 2:
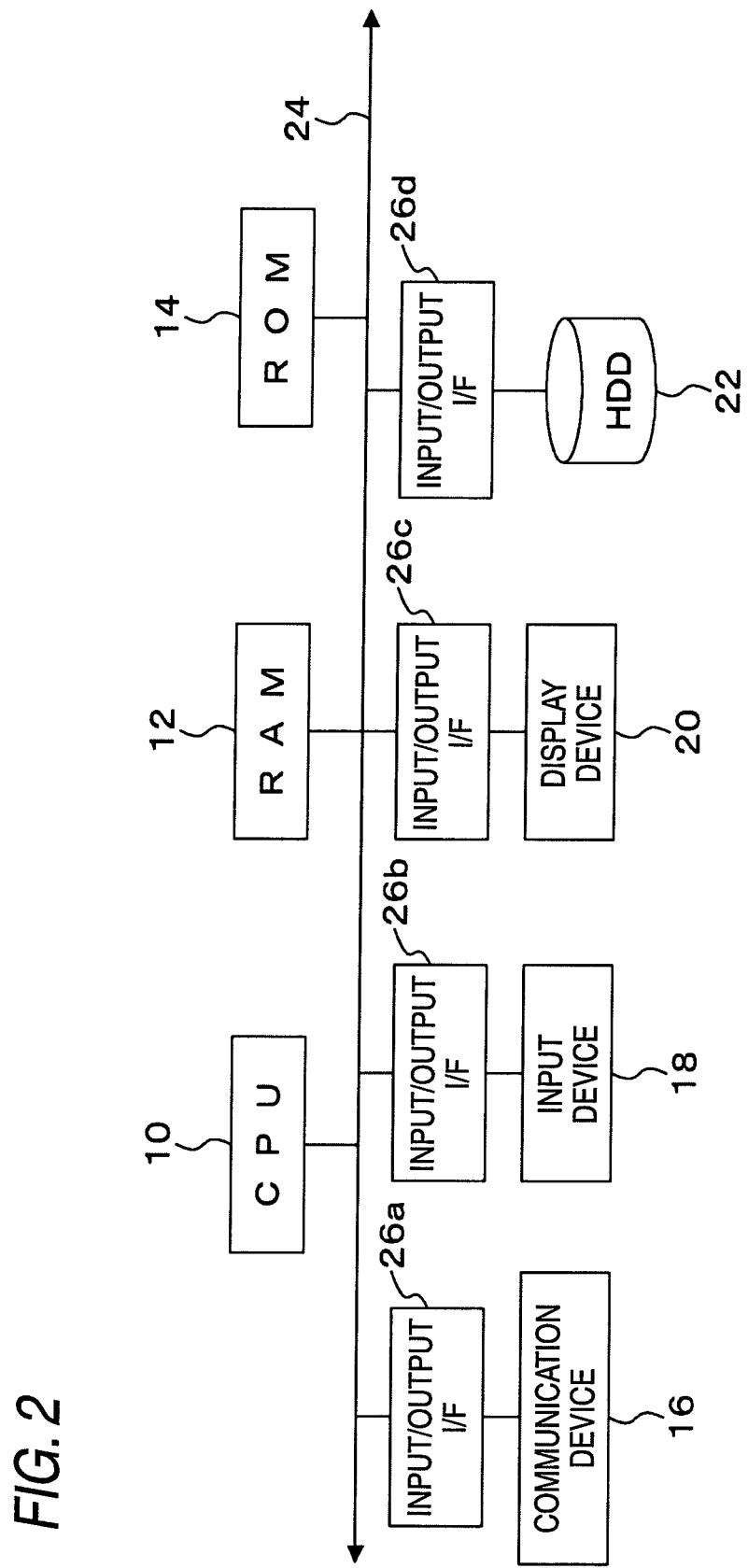
FIG. 2 is a diagram showing an example of the hardware configuration of a computer constituting a spot color processing information providing device and an image forming device which are included in the image processing system according to the exemplary embodiment.

FIG. 2 shows an example of the hardware configuration of a computer constituting the spot color processing information providing device 102 and the image forming device 104, which are included in the image processing system 100 according to the exemplary embodiment. In FIG. 2, the spot color processing information providing device 102 and the image forming device 104 include a central processing unit (e.g., CPU such as a microprocessor) 10, a random access memory (RAM) 12, a read-only memory (ROM) 14, a communication device 16, an input device 18, a display device 20 and a hard disk drive (HDD) 22. Also, these components are interconnected via a bus 24. The communication device 16, the input device 18, the display device 20 and the hard disk drive 22 are connected to the bus 24 via input/output interfaces 26*a*, 26*b*, 26*c* and 26*d*, respectively.

The CPU 10 controls operations of respective section (which will be described later) based on a control program stored in the RAM 12 or ROM 14. The RAM 12 mainly functions as a working area of the CPU 10, and the ROM 14 stores a control program such as BIOS and other data used by the CPU.

Also, the communication device 16 includes a USB (universal serial bus) port, a network port and other appropriate interfaces, and is used by the CPU to exchange data with an external device via the communication line such as the network.

Also, the input device 18 includes a keyboard, a pointing device and a touch panel, and is used by the user to input an operation instruction. Also, the input device 18 may function as an interface for a colorimeter and be configured to acquire colorimetric data measured by the colorimeter.

Also, the display device 20 includes a liquid crystal display and a touch panel, and displays a processing result by the CPU 10.

Also, the hard disk drive 22 includes a storage device which stores various kinds of data required for later processing. Instead of the hard disk drive 22, a non-volatile storage device such as EEPROM may be used.

Figure 3:
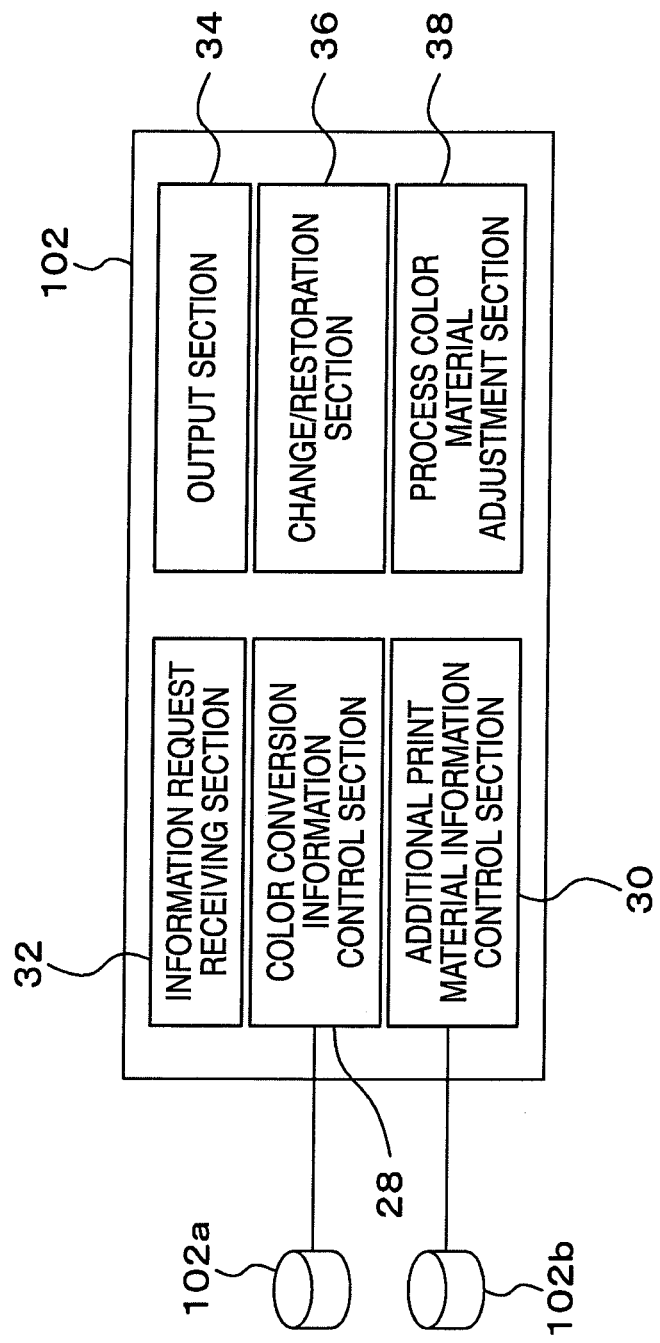
FIG. 3 is a functional block diagram of the spot color processing information providing device in the image processing system according to the exemplary embodiment.

FIG. 3 is a functional block diagram of the spot color processing information providing device 102 in the image processing system 100 according to the exemplary embodiment. In FIG. 3, the spot color processing information providing device 102 includes a color conversion information control section 28, an additional print material information control section 30, an information request receiving section 32, an output section 34, a change/restoration section 36 (an example of a change/restoration unit) and a process color material adjustment section 38 (an example of an adjustment unit). These sections may be implemented by the CPU 10 and the program for controlling the processing operation of the CPU 10, for example.

The color conversion information control section 28 stores, in the color conversion information storage device 102*a*, the color conversion information for converting the name of the spot color other than the process colors into the combination of the process colors. The color conversion information control section 28 also reads the color conversion information from the color conversion information storage device 102*a* in accordance with a request from the image forming device 104 and outputs the read color conversion information via the output section 34 to the image forming device 104. A certain value in a color space may be set as the color conversion information based on colorimetric data of the spot color measured by a colorimeter, for example. The color space may be the L*a*b color specification system, for example.

The additional print material information control section 30 stores, in the additional print material information storage device 102*b*, the additional print material information regarding the additional print material, which is used in printing the spot color with the printer 104*a*. The additional print material information control section 30 also reads the additional print material information from the additional print material information storage device 102*b* in accordance with a request from the image forming device 104 and outputs the read additional print material information via the output section 34 to the image forming device 104. The user may be allowed to input a value corresponding to a print purpose and/or the characteristics of the printer as the additional print material information. The additional print material information may be input from the input device 18 or the print control device 106.

The information request receiving section 32 receives the request for the color conversion information and the request for the additional print material information from the image forming device 104.

The output section 34 outputs the color conversion information and the additional print material information to the image forming device 104 in response to the information requests received by the information request receiving section 32.

Upon receipt of a temporary change instruction for the additional print material information via the communication device 16 from the print control device 106, the change/restoration section 36 changes contents of the additional print material information stored in the additional print material information storage device 102*b* based on the received temporary change instruction, and outputs the changed additional print material information to the image forming device 104. Also, after the output to the image forming device 104, the change/restoration section 36 restores the original contents of the additional print material information.

When the additional print material information control section 30 stores the additional print material information in the additional print material information storage device 102b, the process color material adjustment section 38 calculates a total amount of (i) materials of process colors which are used for the spot color and (ii) the additional print material. If the calculated total amount exceeds a certain threshold value, the process color material adjustment section 38 adjusts the amounts of materials of process colors. In this case, in order to form a spot image which is closer to user's recognition, the process color material adjustment section 38 may adjust the total amount to be less than the certain threshold value only by adjusting the amounts of materials of process colors without decreasing the use amount of the additional print material.

Figure 4:
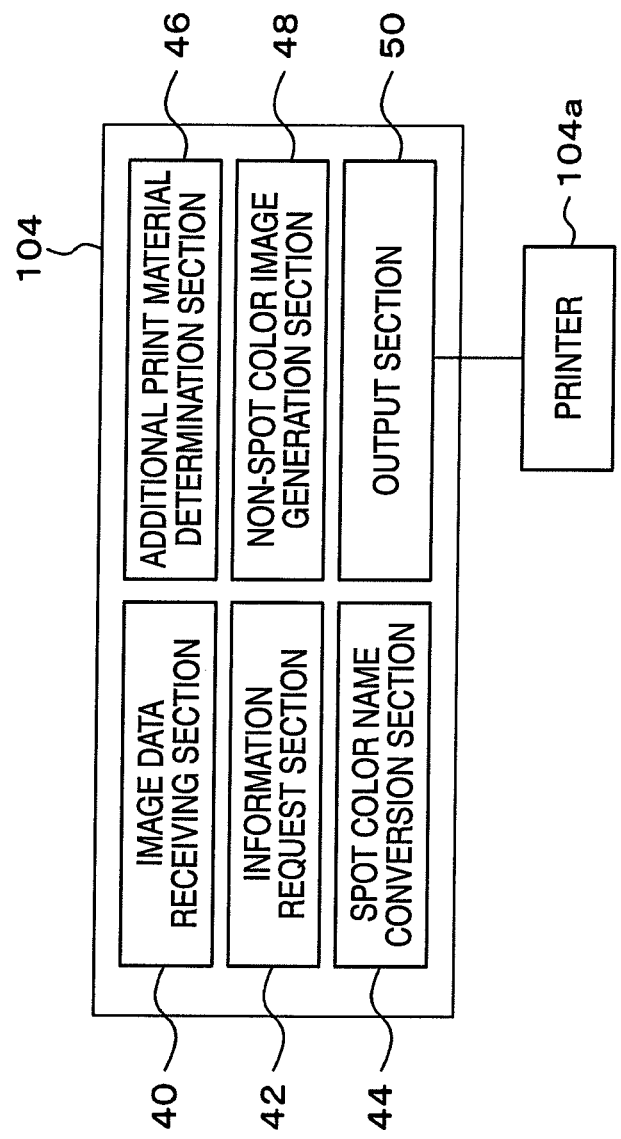
FIG. 4 is a functional block diagram of the image forming device in the image processing system according to the exemplary embodiment.

FIG. 4 is a functional block diagram of the image forming device 104 in the image processing system 100 according to this embodiment. In FIG. 4, the image forming device 104 includes an image data receiving section 40, an information request section 42, a spot color name conversion section 44 (an example of a conversion unit), an additional print material determination section 46 (an example of a determination unit), a non-spot color image generation section 48 and an output section 50. These sections may be implemented by the CPU 10 and the program for controlling the processing operation of the CPU 10, for example.

The image data receiving section 40 receives the image data of the print object, which is output together with the print instruction from the print control device 106, via the communication device 16.

The information request section 42 makes the request for the color conversion information and the request for the additional print material information to the spot color processing information providing device 102, based on the name of the spot color included in the image data received by the image data receiving section 40. The information request section 42 receives each piece of requested information from the output section 34 of the spot color processing information providing device 102, and outputs the color conversion information and the additional print material information to the spot color name conversion section 44 and the additional print material determination section 46, respectively. The additional print material information may be temporarily changed by the change/restoration section 36.

The spot color name conversion section 44 converts the name of the spot color included in the image data, which is received from the print control device 106 by the image data receiving section 40, into the color gamut adjustment information indicating the combination of process colors, based on the received color conversion information, which the information request section 42 has requested for and received from the spot color processing information providing device 102. The color gamut adjustment information may be print data (e.g., C, M, Y and K values) that can be processed by the printer 104a.

The additional print material determination section 46 determines the use amount of additional print material and the drawing method for the name of the spot color included in the image data received by the image data receiving section 40, based on the additional print material information. The printer 104a prints the additional print material on an image, which is formed in accordance with the color gamut adjustment information generated by the spot color name conversion section 44, based on the use amount of additional print material and the drawing method, which are determined by the additional print material determination section 46.

The non-spot color image generation section 48 extracts image data (non-spot color image data) not including a name of a spot color from the image data received by the image data receiving section 40, and generates print data (e.g., C, M, Y and K values) that can be processed by the printer 104a.

The output section 50 outputs (i) the non-spot color image data, (ii) the color gamut adjustment information indicating the combination of process colors which is obtained by converting the name of the spot color, (iii) the use amount of additional print material and (iv) the drawing method to the printer 104a, and prints the print data including the name of the spot color on the medium such as paper.

A part of the spot color processing information providing device 102 and the image forming device 104 in the image processing system 100 may be implemented by a dedicated hardware (e.g., ASIC, etc.). Also, each configuration may be distributed over plural devices, and interconnected by the communication line. Also, the configuration of the image processing system 100 may be incorporated into a copying machine, a facsimile apparatus, a scanner, a printing device, a multi-functional machine (also called a multi-functional copying machine having functions of a scanner, a printer, a copying machine and a facsimile machine).

Figure 5:
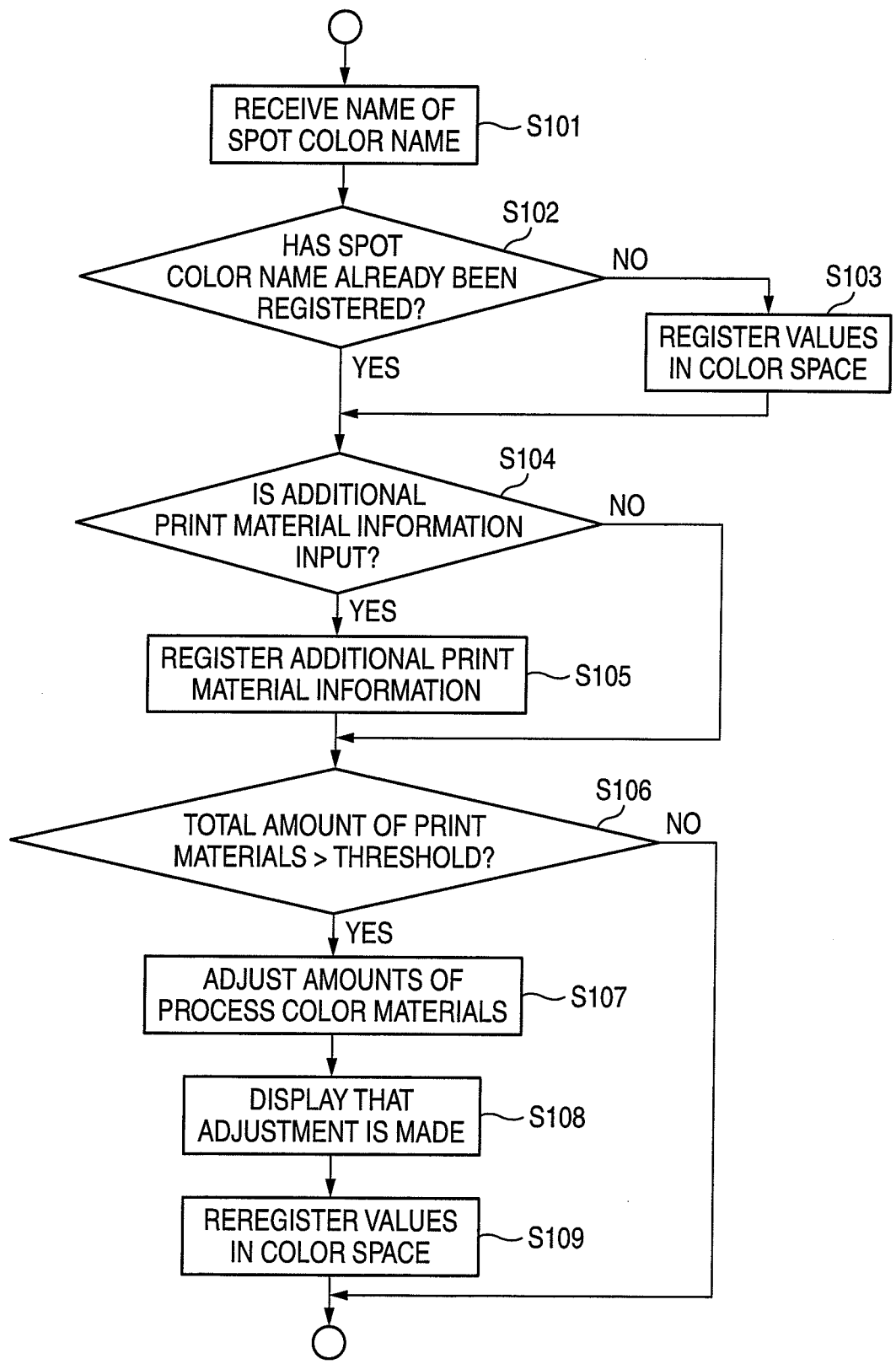
FIG. 5 is a flowchart showing an operation example of the image processing system according to the exemplary embodiment.

FIG. 5 shows a flow of an operation example of the image processing system 100 according to the exemplary embodiment. FIG. 5 is the operation example of a process for registering the color conversion information and the additional print material information for the name of the spot color name in the spot color processing information providing device 102. Also, FIG. 6 shows an example of a spot color name registration screen. The registration screen of FIG. 6 is displayed on a display screen of the display device 20 or the print control device 106.

In FIG. 5, if a user inputs a name of a spot color from an external device such as the print control device 106 of the image processing system 100 or from the input device 18, the color conversion information control section 28 and the additional print material information control section 30 of the spot color processing information providing device 102 receive the input name of the spot color (S101).

The color conversion information control section 28 determines as to whether or not the color conversion information for the name of the spot color name received at S101 has already been registered in the color conversion information storage device 102a (S102). The "registration" (register, registering) means storing information in the color conversion information storage device 102a. If the name of the spot color has not been registered, the color conversion information control section 28 registers values in the predetermined color space based on the colorimetric data which is obtained by measuring the spot color by the colorimeter, in the color conversion information storage device 102a as the color conversion information (S103). The color space in this exemplary embodiment may be the L*a*b* color specification system as described above.

More specifically, entry fields for respective values of L*a*b* or respective values of C, M, Y and K which are values in the color space are provided on the registration screen displayed by the display device 20 as shown in FIG. 6. The values based on the colorimetric data of the spot color whose name is received by the color conversion information control section 28 are input into these entry fields. In this case, if a button of "using colorimeter" shown in FIG. 6 is pressed, the colorimetric data of the colorimeter is fetched via the input device 18, and the values in the color space of either L*a*b* or CMYK designated by the user are reflected to the entry fields. Also, the user may input respective values into the entry fields.

After registration of the color conversion information or if the color conversion information control section 28 determines at S102 that the name of the spot color has already been registered, the additional print material information control section 30 determines as to whether or not the user has input the additional print material information for the name of the spot color (S104). If the user has input the additional print material information, the additional print material information control section 30 registers (stores) the input additional print material information in the additional print material information storage device 102b, and the process proceeds to step S106 (S105). At this time, the user inputs a use amount of additional print material and a drawing method, which he/she considers to be appropriate for the printer 104a, from the print control device 106 or the input device 18. Also, if the user has not input the additional print material information, the process proceeds to step S106 without the process for registering the additional print material information being performed.

Specifically, the additional print material information is input from the registration screen shown in FIG. 6. In this case, the user designates a kind of the additional print material in the field of "special effect". In the example of FIG. 6, "gloss" is designated, and the transparent toner is thus used in the electro-photographic type printer. Alternatively, matting or a metal tone may be designated. Also, no special effect, namely, no use of the additional print material may be designated. Also, the drawing method for the additional print material is designated in the field of "how to put special material". Although "solid", that is, filling is designated in the example of FIG. 6, various kinds of pattern, density and hatching may be designated. Further, the use amount of additional print material is designated in the field of "level". As the numerical value of level increases, the use amount increases. The amounts indicated by the respective numerical values are set up in advance for each additional print material. The name of the spot color which is a registration object is displayed on the registration screen, as shown in FIG. 6. A "registration" button is provided at the lowest part of the registration screen. By pressing the registration button, the color conversion information and the additional print material information are registered in the color conversion information storage device 102a and the additional print material information storage device 102b.

There are cases where the fields of the "special effect", "how to put special material" and "level" can not be designated or are limited to only one designated value, because there is no effect of designation or no difference in effect by changing the designated value, depending on the name of the spot color which is the registration object. In this case, the entry field that can not be designated is not displayed, and the designated value limited to only one is simply displayed, so that the user can not select or change it (fixed value).

Figure 7:
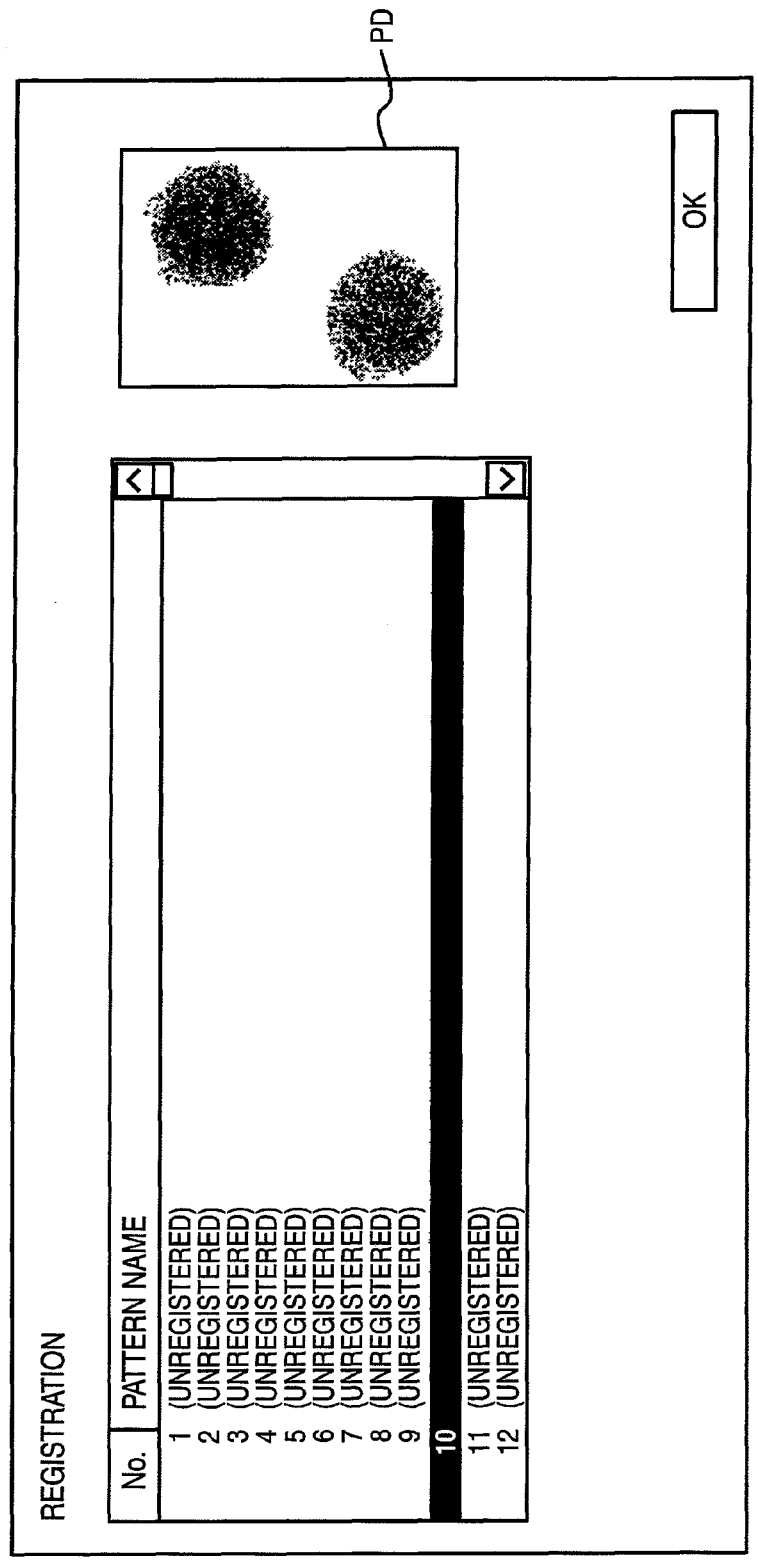
FIG. 7 is a view showing an example of a drawing method registration screen for the additional print material.

Also, the drawing method of the additional print material designated in the field of "how to put special material" may be registered in advance. FIG. 7 shows an example of the registration screen for the drawing method of the additional print material. The registration screen is displayed on the display screen of the display device 20 or the print control device 106. In FIG. 7, a name of the drawing method can be set as a pattern name. The drawing method can be registered by setting a name to the drawing method displayed on a preview screen PD. In the example of FIG. 7, a design displayed on the preview screen PD is registered, as the drawing method, in the pattern name of No. 10 which is displayed in the reverse manner.

Turning back to FIG. 5, the process color material adjustment section 38 calculates the total use amount of (i) the process color materials and (ii) the additional print material used for the registered name of the spot color, based on the color conversion information and the additional print material information. Then, the process color material adjustment section 38 determines as to whether or not the total use amount exceeds the certain threshold value (S106). If the total use amount exceeds the certain threshold value, the process color material adjustment section 38 adjusts the amounts of process color materials so as to reduce the total use amount to be equal to or less than the certain threshold value (S107). In this exemplary embodiment, the use amounts of the process color materials may be adjusted by UCR (under color removal) or GCR (gray color replacement). Also, in this exemplary embodiment, a spot color name management screen is displayed on the display screen of the display device 20 or the print control device 106, and information indicating the use amount of process color material is adjusted is displayed on the management screen (S108). The adjusted use amounts of process color materials are converted into values in the color space of L*a*b* or CMYK and are re-registered in the color conversion information storage device 102a (S109). If the calculated total use amount does not exceed the certain threshold value at S106, the steps S107 to S109 are skipped.

FIG. 8 shows an example of the spot color name management screen. In FIG. 8, for each number representing the name of the spot color, the corresponding values of L*a*b* and CMYK are shown. Also, the symbol "*" is displayed if the total use amount of (i) the process color materials and (ii) the additional print material exceeds the certain threshold value and if the amounts of process color materials are adjusted. In the example of FIG. 8, the symbol "*" representing that adjustment is made is displayed for the second spot color name in which the additional print material (transparent toner) for matting is used as the special effect.

Figure 9:
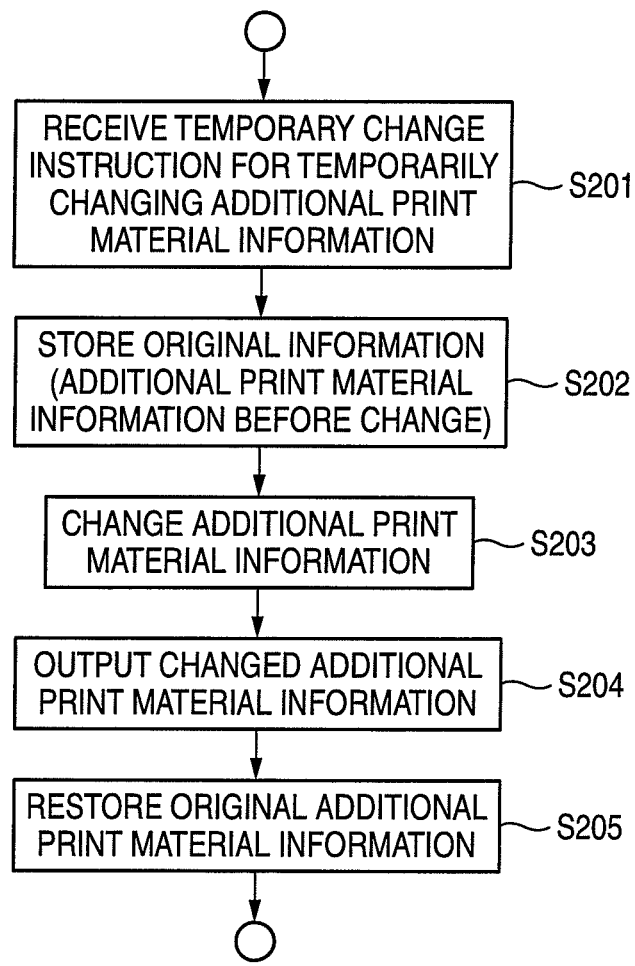
FIG. 9 is a flowchart showing another operation example of the image processing system according to the exemplary embodiment.

FIG. 9 shows a flow of another operation example of the image processing system 100 according to the exemplary embodiment. FIG. 9 is an operation example for temporarily changing contents of the additional print material information storage device 102b.

In FIG. 9, the change/restoration section 36 of the spot color processing information providing device 102 receives a temporary change instruction (an instruction for temporarily changing the additional print material information) via the communication device 16 from the print control device 106 or from the input device 18 (S201). Then, the change/restoration section 36 reads the original additional print material information for the name of the spot color (which is a change object) from the additional print material information storage device 102b. The change/restoration section 36 stores the read additional print material information in a storage area such as the RAM 12 (S202).

Next, the change/restoration section 36 changes contents of the read additional print material information based on the temporary change instruction, and overwrites the changed additional print material information in the additional print material information storage device 102b (S203). Also, the additional print material information after the overwriting is output to the image forming device 104 (S204).

After the output process is ended at S204, the change/restoration section 36 reads the original additional print material information stored in the RAM 12 at 5202, and overwrites again the changed additional print material information stored in the additional print material information storage device 102b, which was overwritten at 5203, with the original additional print material information, to restore the original additional print material information (S205).

Figure 10:
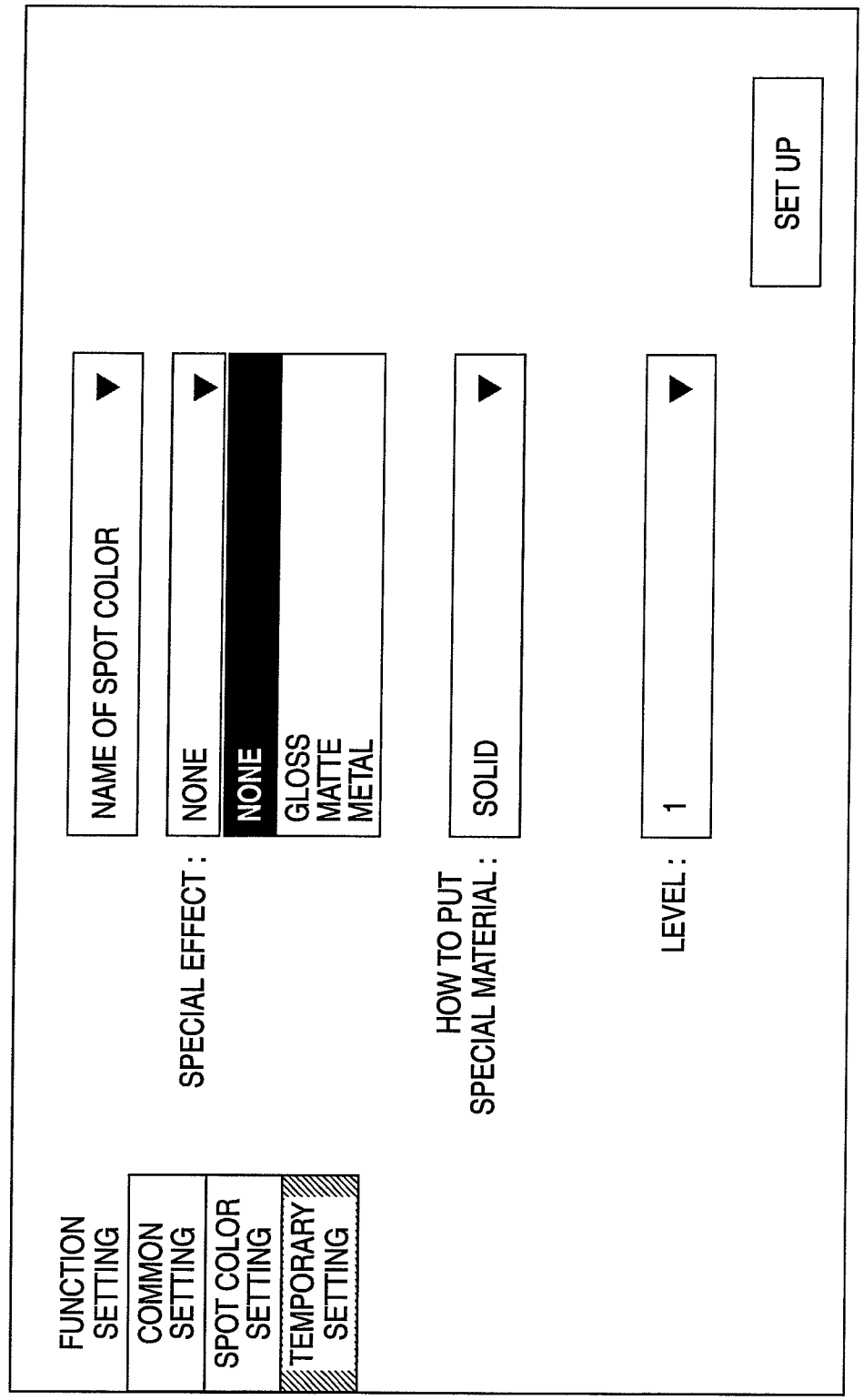
FIG. 10 is a view showing an example of a temporary change instruction input screen for inputting a temporary change instruction.

FIG. 10 shows an example of a temporary change instruction input screen for inputting the temporary change instruction. The temporary change instruction input screen is displayed on the display screen of the print control device 106, for example.

In FIG. 10, the user selects a "temporary setting" from a function setting menu, and selects the name of the spot color (which is a temporary change object) in the field of name of spot color. Next, for the selected name of spot color, a value is selected in each of the fields of "special effect", "how to put special material" and "level". Finally, the temporary change instruction (the instruction for temporarily changing the additional print material information) is sent to the change/restoration section 36 of the spot color processing information providing device 102 by pressing the setting button.

Figure 11:
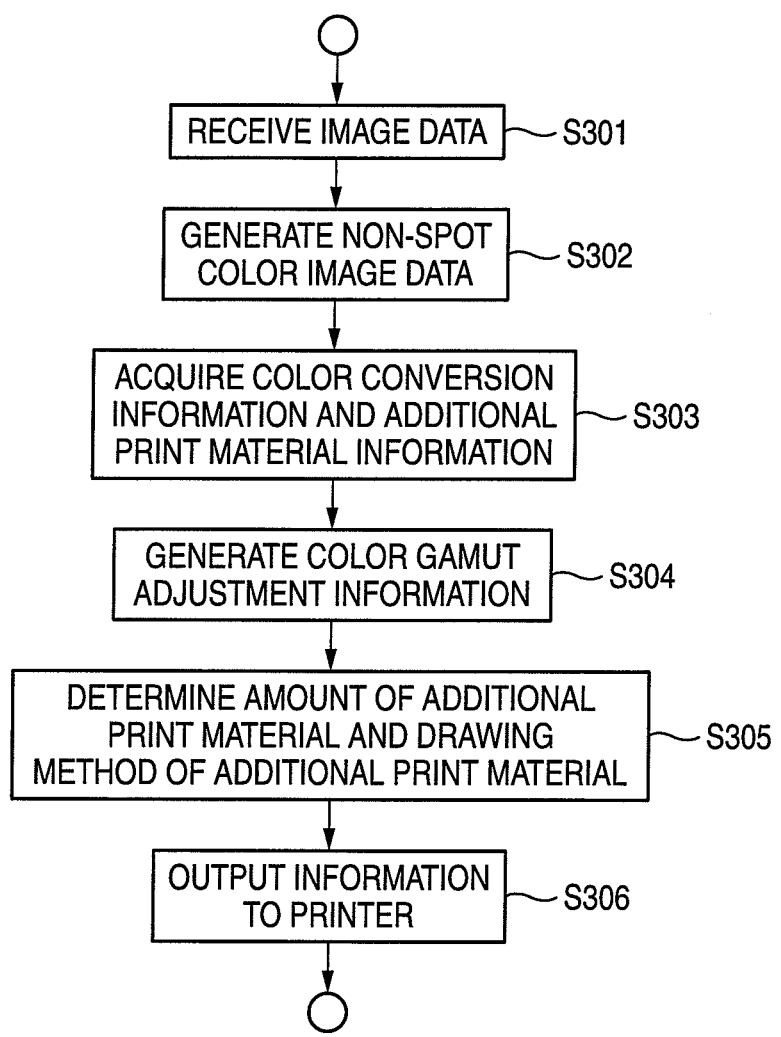
FIG. 11 is a flowchart showing a further operation example of the image processing system according to the exemplary embodiment.

FIG. 11 shows a flow of still another operation example of the image processing system 100 according to the exemplary embodiment. FIG. 11 is the operation example of the image forming process performed in the image forming device 104.

In FIG. 11, the image data receiving section 40 receives the image data which is the print object and which is output together with the print instruction from the print control device 106 (S301). The non-spot color image generation section 48 extracts the non-spot color image data not including the name of the spot color from the image data, and generates the print data (e.g., the values of C, M, Y and K) that can be processed by the printer 104a (S302).

Next, the information request section 42 makes the request for the color conversion information and the request for the additional print material information to the spot color processing information providing device 102 based on the name of the spot color included in the image data. Then, the information request section 42 receives the color conversion information and the additional print material information from the spot color processing information providing device 102 (S303).

The spot color name conversion section 44 generates the color gamut adjustment information indicating the combination of process colors obtained by converting the name of the spot color included in the image data, based on the color conversion information which the information request section 42 receives from the spot color processing information providing device 102 (S304).

The additional print material determination section 46 determines the use amount of additional print material and the drawing method for the name of the spot color, based on the additional print material information which the information request section 42 receives from the spot color processing information providing device 102 (S305). In this case, the additional print material determination section 46 may use the additional print material information, which is temporarily changed by the change/restoration section 36 of the spot color processing information providing device 102 upon receipt of the temporary change instruction from the print control device 106.

The non-spot color image data, the color gamut adjustment information and information specifying the use amount of additional print material and the drawing method, which are generated in the above way, are output via the output section 50 to the printer 104a (S306). Thereby, the image is formed by the printer 104a.

A program for performing each step in FIGS. 5, 9 and 11 may be stored in the recording medium. Alternatively, the program may be provided through the communication line.

What is claimed is:

1. An image processing apparatus comprising:
a first storage unit that stores color conversion information for converting a name of a spot color other than process colors into a combination of the process colors;
a second storage unit that stores additional print material information regarding an additional print material, the additional print material information being input by a user for the name of the spot color;
a conversion unit that converts the name of the spot color, which is included in image data, into the combination of the process colors based on the color conversion information;
a determination unit that determines, for the name of the spot color included in the image data, a total use amount of a sum of color materials of the process colors and gloss adjusting material of the additional print material, based on the additional print material information; and
an adjustment unit that if the determination indicates the total use amount exceeds a certain threshold value, adjusts the total use amount to be less than the certain threshold value only by adjusting an amount of the color materials of the process colors without decreasing an amount of the gloss adjusting material of the additional print material.

2. The image processing apparatus according to claim 1, wherein the color conversion information stored in the first storage unit includes colorimetric data which is prepared in advance.

3. A non-transitory computer-readable medium storing a program that causes a computer to execute image processing, the image processing comprising:
converting a name of a spot color, which is included in image data, into a combination of the process colors based on color conversion information which is stored in a storage unit;
determining, for the name of the spot color included in the image data, a total use amount of a sum of color materials of the process colors and gloss adjusting material of an additional print material, based on additional print material information which is stored in the storage unit and which is input by a user for the name of the spot color; and
adjusting, if the determined total use amount exceeds a certain threshold value, the total use amount to be less than the certain threshold value only by adjusting an amount of the color materials of the process colors without decreasing an amount of the gloss adjusting material of the additional print material.

4. The non-transitory computer-readable medium according to claim 3, wherein the stored color conversion information includes colorimetric data which is prepared in advance.

5. An image processing system comprising:
a storage device; and
an image forming device,
wherein a storage device includes
a first storage unit that stores color conversion information for converting a name of a spot color other than process colors into a combination of the process colors,
a second storage unit that stores additional print material information regarding an additional print material, the additional print material information being input by a user for the name of the spot color, and
a change/restoration unit that, upon receipt of a temporal change instruction, changes contents of the additional print material information stored in the second storage unit in accordance with the temporal change instruction, outputs the changed additional print material information to the image forming device, and then restores the additional print material information before the changing, the image forming device includes
a conversion unit that receives the additional print material information from the second storage unit and converts the name of the spot color, which is included in image data, into the combination of the process colors based on the received color conversion information, and
a determination unit that receives the additional print material information, which is temporarily changed by the change/restoration unit, and determines, for the name of the spot color included in the image data, a use amount of the additional print material and a drawing method, based on the additional print material information, which is temporarily changed, and the image forming device forms a spot color image based on the combination of process colors, the determined use amount of the additional print material and the determined drawing method.

6. The image processing system according to claim 5, wherein the temporary change instruction is input from a temporary change instruction input screen displayed on an information input device used by the user.

7. An image processing method comprising:
converting a name of a spot color, which is included in image data, into a combination of the process colors based on color conversion information which is stored in a storage unit;
determining, for the name of the spot color included in the image data, a total use amount of a sum of color materials of the process colors and gloss adjusting material of an additional print material, based on additional print material information which is stored in the storage unit and which is input by a user for the name of the spot color; and
adjusting, if the determined total use amount exceeds a certain threshold value, the total use amount to be less than the certain threshold value only by adjusting an amount of the color materials of the process colors without decreasing an amount of the gloss adjusting material of the additional print material.

8. The image processing method according to claim 7, wherein the stored color conversion information includes colorimetric data which is prepared in advance.

* * * * *